United States Patent
Nagai et al.

(10) Patent No.: US 12,086,176 B2
(45) Date of Patent: Sep. 10, 2024

(54) INFORMATION PROCESSING APPARATUS, AND INFORMATION PROCESSING METHOD

(71) Applicant: astamuse company, Ltd., Tokyo (JP)

(72) Inventors: Ayumu Nagai, Tokyo (JP); Nobuaki Kawaguchi, Tokyo (JP); Rie Osawa, Tokyo (JP)

(73) Assignee: ASTAMUSE COMPANY, LTD., Tokyo (JP)

( * ) Notice: Subject to any disclaimer, the term of this patent is extended or adjusted under 35 U.S.C. 154(b) by 0 days.

(21) Appl. No.: 18/160,728

(22) Filed: Jan. 27, 2023

(65) Prior Publication Data

US 2023/0169106 A1 Jun. 1, 2023

Related U.S. Application Data (63) Continuation of application No. PCT/JP2021/027084, filed on Jul. 20, 2021.

(30) Foreign Application Priority Data

Jul. 29, 2020 (JP) .................. 2020-128105

(51) Int. Cl.
*G06F 16/38* (2019.01)
*G06F 16/31* (2019.01)
*G06Q 50/18* (2012.01)

(52) U.S. Cl.
CPC .......... *G06F 16/382* (2019.01); *G06F 16/313* (2019.01); *G06Q 50/184* (2013.01)

(58) Field of Classification Search
CPC ...... G06F 16/382; G06F 16/313; G06F 16/38; G06Q 50/184; G06Q 50/18
See application file for complete search history.

(56) References Cited

U.S. PATENT DOCUMENTS

| | | | | |
|---|---|---|---|---|
| 2006/0143171 A1* | 6/2006 | Doerre | .................. | G06F 16/316 707/999.005 |
| 2008/0177592 A1* | 7/2008 | Masuyama | ............ | G06Q 10/04 705/7.11 |
| 2013/0282599 A1* | 10/2013 | Kang | .................. | G06Q 50/184 705/310 |

(Continued)

FOREIGN PATENT DOCUMENTS

| | | | |
|---|---|---|---|
| JP | 2005-115831 A | | 4/2005 |
| JP | 2014-199661 A | | 10/2014 |

(Continued)

OTHER PUBLICATIONS

International Search Report, issue on Oct. 26, 2021, in corresponding International Patent Application No. PCT/JP2021/027084, 7 pages.

*Primary Examiner* — Cam Y T Truong
(74) *Attorney, Agent, or Firm* — Maier & Maier, PLLC (57) ABSTRACT

An information processing apparatus including processing circuitry configured to acquire a base group that is a set of documents concerning a prescribed intellectual property right based on a prescribed search query and evaluate, for each document included in the base group, a value that is calculated based on a parameter concerning the document and a first weight linked to patenting of the document, as a first index indicating a relative strength of right of the document in the base group.

10 Claims, 4 Drawing Sheets

(56) References Cited

U.S. PATENT DOCUMENTS

2013/0311397 A1* 11/2013 Shah .................. G06Q 40/06
                                                    705/36 R
2018/0300323 A1    10/2018 Lee et al.
2024/0112533 A1*   4/2024 Biemer ................ G07F 17/323

FOREIGN PATENT DOCUMENTS

| JP | 2015-125484 A | 7/2015 |
| JP | 2018-067274 A | 4/2018 |
| JP | 6707612 B2 | 6/2019 |
| KR | 20120129584 A | 11/2012 |
| KR | 20200024985 A | 3/2020 |
| WO | 2008075744 A1 | 6/2008 |
| WO | 2008054001 A1 | 2/2010 |

* cited by examiner

EXAMPLE OF INDICES OF COMPANY A IN REGION 001

| REGION NAME | APPLICANT NAME | PATENT DOCUMENT ID | FIRST INDEX (DEVIATION VALUE) | | SECOND PERIOD (YEARS) | | SECOND INDEX |
|---|---|---|---|---|---|---|---|
| REGION 001 | COMPANY A | 003 | 55.7 | × | 4 | = | 223.1 |
| | COMPANY A | 004 | 52.8 | × | 1 | = | 52.8 |
| | COMPANY A | 001 | 40.5 | × | 4 | = | 121.5 |
| | COMPANY B | 001 | 30.8 | × | 2 | = | 61.6 |
| | COMPANY B | 002 | 38.8 | × | 0 | = | 0 |
| | COMPANY C | 005 | 62.1 | × | 2 | = | 124.1 |

THIRD INDEX OF COMPANY A
MAXIMUM VALUE OF FIRST INDICES
→ 55.7

TOTAL SUM OF SECOND INDICES OF COMPANY A
(FIRST INDEX ≥ 50)
→ 223.1+52.8=275.9

Fig. 4

INFORMATION PROCESSING APPARATUS, AND INFORMATION PROCESSING METHOD

CROSS-REFERENCE TO RELATED APPLICATION

This application is based upon and claims the benefit of priority from the prior Japanese Patent Application No. 2020-128105, filed Jul. 29, 2020, and from PCT Patent Application No. PCT/JP2021/027084, the entire contents all of which are incorporated herein by reference.

FIELD

Embodiments described herein relate generally to an information processing apparatus, and an information processing method.

BACKGROUND

There have been needs of evaluating the value of patents possessed by a company appropriately for planning a business strategy.

For example, it is known that evaluating the value of a patent application or a patent right appropriately based on numerical value information which is objectively determined based on progress information or content information on the patent application or the patent right by acquiring, from a patent database, a plurality of items of patent data belonging to a prescribed technical field and patent attribute information on each item of patent data, classifying the acquired items of patent data into groups of prescribed time periods, and calculating the evaluation value of each item of patent data for each group from a value determined for the group using the patent attribute information on each item of patent data belonging to the group.

Although the evaluation of such a value can vary, a conventional scoring system such as one based on the approach described above only makes an evaluation using the absolute value of a patent. As a result, the value of an intellectual property cannot be evaluated appropriately.

SUMMARY

An objective of the present embodiment is therefore to evaluate the value of an intellectual property appropriately.

DETAILED DESCRIPTION

In general, according to one embodiment, an information processing apparatus including processing circuitry according to the present disclosure configured to acquire a base group that is a set of documents concerning a prescribed intellectual property right based on a prescribed search query and evaluate, for each document included in the base group, a value that is calculated based on a parameter concerning the document and a first weight linked to patenting of the document, as a first index indicating a relative strength of right of the document in the base group.

An Embodiment of the present disclosure will be described below with reference to the drawings. An information processing system 1 according to the present embodiment is a system for evaluating the value of an intellectual property possessed by a legal person or a natural person (hereinafter, will be referred to as a legal person, etc.). In the present embodiment, the description will be given of a case where the intellectual property is a patent. In the following description, the same components will be denoted by the same reference numerals. The components are the same in name and function. Thus, the detailed description of such components will not be repeated.

1. General Configuration of Information Processing System 1

Figure 1:
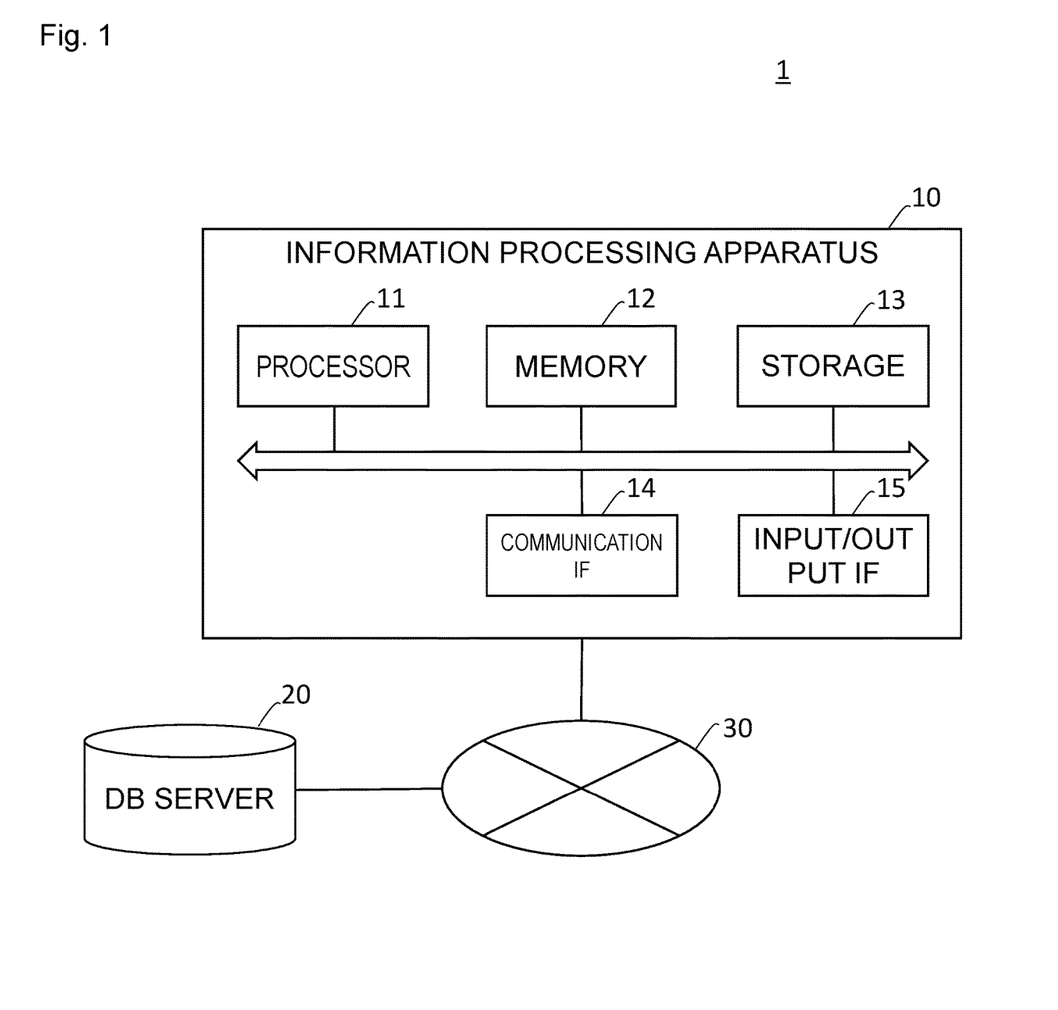
FIG. 1 is a block diagram illustrating a general configuration of an information processing system 1.

FIG. 1 is a block diagram illustrating a general configuration of the information processing system 1. As illustrated in FIG. 1, the information processing system 1 includes an information processing apparatus 10, a database (DB) server 20, and a network 30. The information processing apparatus 10 and the DB server 20 are connected together via the network 30 so as to enable the information processing apparatus 10 and the DB server 20 to communicate with each other. The network 30 is constituted by a wired or wireless network. The information processing apparatus 10 and the DB server 20 are connected to the network 30 using a given wired or wireless telecommunications standard.

The information processing apparatus 10 is an apparatus that performs an evaluation process of evaluating the value of a patent that a legal person or the like possesses. The information processing apparatus 10 is, for example, a computer of a laptop type, a rack-mounted type, a tower type, or the like. The information processing apparatus 10 may be constituted by a plurality of information processing apparatuses 10 and the like.

The information processing apparatus 10 includes a processor 11, a memory 12, a storage 13, a communication IF 14, and an input/output IF 15.

The processor 11 is a piece of hardware for executing a set of instructions written in a program and is constituted by an arithmetic unit, registers, peripheral circuits, and the like.

The memory 12 is for storing programs, data to be processed by the programs, and the like temporarily. For example, the memory 12 is a volatile memory such as a dynamic random access memory (DRAM).

The storage 13 is a storage device for saving data. For example, the storage 13 is a flash memory, a hard disc drive (HDD), or a solid state drive (SSD).

The communication IF 14 is an interface through which the information processing apparatus 10 inputs and outputs signals to communicate with external equipment.

The input/output IF 15 functions as an interface with an input device for receiving input operations (e.g., a pointing device such as a mouse, a keyboard, etc.) and an output device for presenting information (a display, a speaker, etc.).

The DB server 20 is a DB server storing information on patent documents that are collected beforehand.

A piece of information on a patent document includes its technical field, registration information that indicates a patent right according to the patent document has been established and registered, information on an applicant, a filing date, a registration date, a status of a patent application, a citation performance that indicates the number of citations in examinations, trials and appeals, or lawsuits concerning other patent applications, a country in which the patent document is applied, a family number that is the number of countries in which the embodiment according to the patent document is applied, and the like.

The DB server 20 is capable of searching for patent documents. Specifically, upon receiving a search query, the DB server 20 searches patent documents based on the search query and transmits a plurality of searched patent documents to a transmission source of the search query. The search query includes various types of information used for searching for patent documents, such as a technical field, a keyword, the name or designation of an applicant, and a publication date. Although the description of the present embodiment is given of an example in which the DB server 20 is configured as an apparatus separate from the information processing apparatus 10, it should be noted that the DB server 20 may be configured as the same apparatus as the information processing apparatus 10.

2. Functional Configuration of Information Processing Apparatus 10

Figure 2:
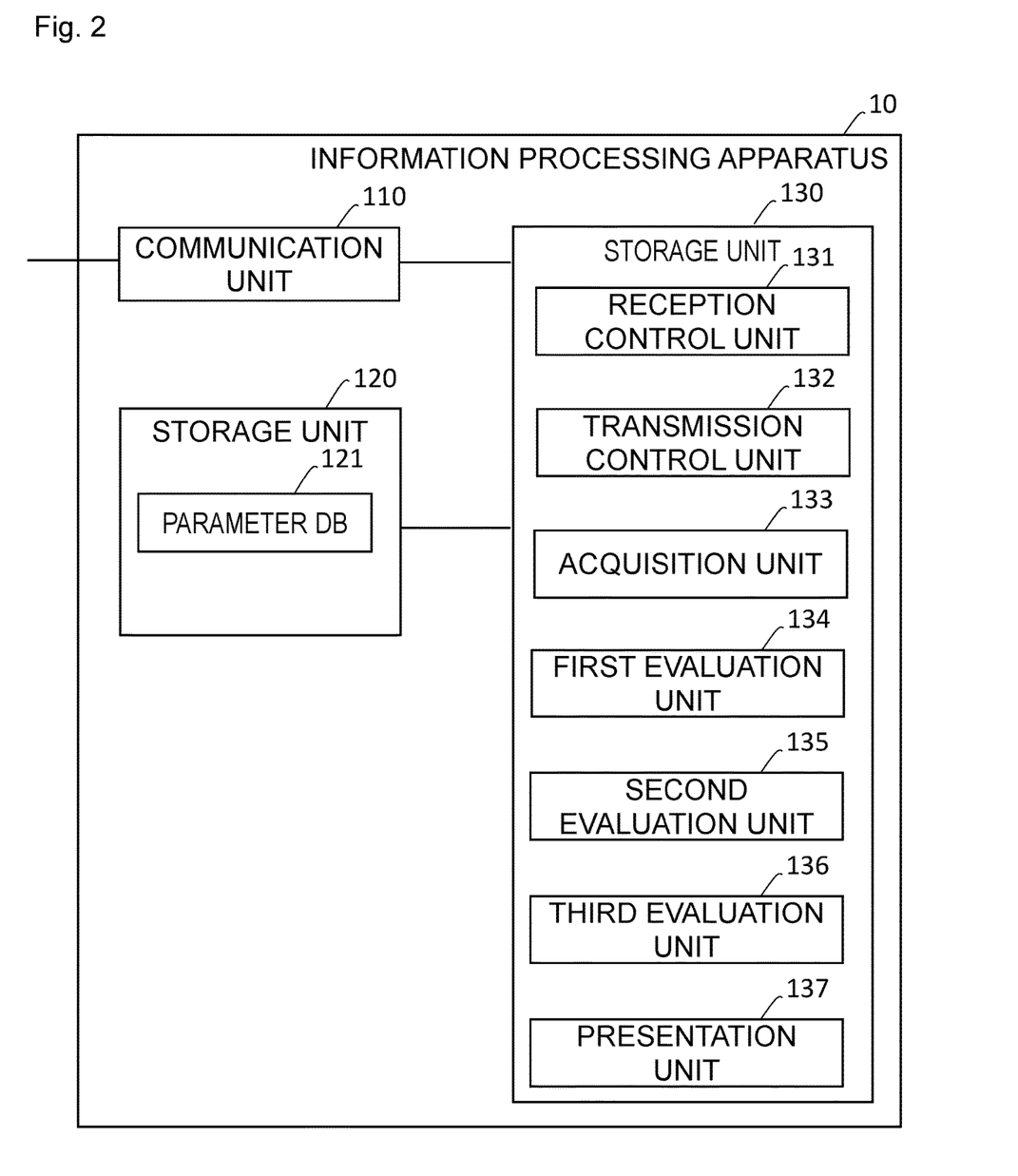
FIG. 2 is a block diagram illustrating the functional configuration of an information processing apparatus 10.

FIG. 2 is a block diagram illustrating the functional configuration of the information processing apparatus 10. As illustrated in FIG. 2, the information processing apparatus 10 includes a communication unit 110, a storage unit 120, and a control unit 130.

The communication unit 110 performs such a process that the information processing apparatus 10 communicates with the external equipment.

The storage unit 120 stores the data and programs to be used by the information processing apparatus 10. The storage unit 120 stores a parameter DB 121 and the like.

The parameter DB 121 is a database that retains parameters to be used in the evaluation process described later. The parameters will be described later in detail.

The control unit 130 exercises functions indicated by a reception control unit 131, a transmission control unit 132, an acquisition unit 133, a first evaluation unit 134, a second evaluation unit 135, a third evaluation unit 136, and a presentation unit 137, by the processor 11 of the information processing apparatus 10 performing processing according to programs.

The reception control unit 131 controls a process in which the information processing apparatus 10 receives signals from the external equipment according to a communications protocol. Specifically, the reception control unit 131 receives various types of information from the DB server 20. For example, the reception control unit 131 receives a set of patent documents from the DB server 20.

The transmission control unit 132 controls a process in which the information processing apparatus 10 transmits signals to external equipment according to the communications protocol. Specifically, the transmission control unit 132 transmits prescribed information to the DB server 20. For example, the transmission control unit 132 transmits a search query to the DB server 20.

The acquisition unit 133 acquires a base group that is a set of documents concerning a patent right based on a prescribed search query. Specifically, the acquisition unit 133 first receives an input of a search query from a user. The acquisition unit 133 then causes the transmission control unit 132 to transmit the search query to the DB server 20. By the reception control unit 131 receives, as a search result, a base group that is a set of documents concerning a patent right from the DB server 20, the acquisition unit 133 acquires the base group. The document concerning a patent right is a published unexamined patent application (including a Japanese translation of PCT international application, a domestic re-publication of PCT international application, etc.), an international application that is internationally published, a patent gazette, or a foreign gazette that corresponds to one of them. In addition, the documents concerning a patent right may include a document concerning a utility model. The search query includes information on a technical field and the like. As a result, the base group is a set of patent documents having a specific technical field, a specific keyword, and the like. That is, the base group includes not simply patent documents belonging to a technical field but also a set of patent documents acquired by a search. This is because the information processing apparatus according to the present disclosure is intended to provide a relative value in the case where patent documents depend on the base group.

For each patent document included in the base group, the first evaluation unit 134 calculates a value based on a parameter concerning the patent document and evaluates the value as a first index indicating a relative strength of right of the patent document in terms of the value with respect to the documents in the base group.

Specifically, first, for each patent document included in the base group, the first evaluation unit 134 calculates a first index of the patent document based on a parameter concerning the patent document and a first weight that is linked to patenting of the patent document, as a value that represents a relative relation of the patent document to the patent documents included in the base group in terms of the first index.

More specifically, the first evaluation unit 134 calculates the first index using Expression (1) shown below.

$$p_i = D(x_i, x, N) \qquad (1)$$

In Expression (1) above, pi is a first index of a patent document i, N is the number of patent documents included in the base group, and i is a counter ($1 \leq i \leq N$) of the patent documents in the base group. In addition, xi is a score of the patent document i, and x (x in boldface type in Expression (1)) is a score of all patent documents included in the base group. A function D is a function of determining a deviation value of a score xi in the base group.

The first evaluation unit 134 calculates the score xi using Expression (2) shown below.

$$x_i = f\left(w_i \sum\nolimits_{j=1}^{M} k_{ij} p_{ij}\right) \qquad (2)$$

In Expression (2) above, wi is the first weight that is determined based on the patenting of the patent document i, M is the number of parameters, pj is a j-th parameter, and kj is a factor for the parameter pj. The first weight wi is set in such a manner as to take a large value when the patent document i is registered as a patent right and take a small value when the patent document i is unregistrable because, for example, the application is withdrawn, or decision of refusal of the application becomes final and binding. This is because the patent document i can be determined to be highly strong as a patent when a patent right according to the patent document i is established.

A function $f$ is a given function for converting a value in the parentheses. The function $f$ may be a function that outputs the value in the parentheses as it is, or may be a function that normalizes the value in the parentheses to a value easy to calculate or makes the value in the parentheses so small as to fall within a prescribed range.

(Parameters)

The first evaluation unit 134 uses, as a parameter, at least one of the ratio between a first period from a patent application until patenting and a second period from a prescribed reference date until a scheduled date of lapse of patent right, a second weight that is linked to a country in which the document is applied, a family number of the document, and a citation performance that indicates the number of citations of the document in other documents. The parameters are not limited to those described above and may include any parameter concerning geographical coverage of a right or information connected with time. Further, the parameters may be combined as appropriate, and all of the parameters need not necessarily be used.

The citation performance is a parameter for evaluating how strong an impact of the patent document on others is as right to exclude, thus being a parameter that has the greatest influence on the first index. The citation performance may be additionally subjected to weighting based on whether the patent document is cited in countries where patents have a great influence, such as countries mature in the patent system and countries having a large number of annual applications. For example, the weighting can be made in such a manner that the citation performance is increased when the patent document is cited in influential countries (e.g., the United States, European countries, Japan). Such weighting enables the influence of the patent document i to be reflected appropriately. As a result, the first index calculated for each patent document in the base group may be increased irrespective of the status of the patent document (registration, expiration, withdrawal, etc.) when the patent document has such a high citation performance that the patent document has been cited so many times that, for example, subsequent applications are refused, even in the case of the expiration of a patent right according to the patent document or deemed withdrawal of the application due to no request for examination.

The first period is a period from the filing date to the registration date of the patent document i. A shorter first period means a longer duration of the right, and thus the patent document i can be determined to have a strength of right. In the case where the patent document i is still unregistered, this parameter is to be treated as being zero, for example. The second period from the prescribed reference date until the scheduled date of lapse of right is, for example, a period from a date on which the acquisition unit 133 acquires the patent document i until the expiration day of the patent right according to the patent document i. A longer second period means a longer duration of the right, and thus the patent document i can be determined to have a strength of right. The period can be expressed in any time unit such as days, months, and years. The first evaluation unit 134 may use the first period or the second period as it is or may use the ratio between the first period and the second period as a parameter.

In reality, a patent right does not necessarily last until its expiration day. Accordingly, the period of validity of a patent right can be estimated and used as the end of the second period. In this case, the period of validity is estimated based on a peculiarity in each country, how fast a technique or a technology becomes obsolete in each technical field, and the like. At this time, the technical fields can be classified based on the patent classification (IPC, FI, F-term, CPC, etc.).

For example, the first evaluation unit 134 makes the estimation using Expression (3) shown below.

$$\text{Period of validity} = \text{Registration date} + \text{Period until expiration} \times \text{Factor} \quad (3)$$

In Expression (3) above, the registration date is the registration date of the patent document, the period until expiration is a period until the legal expiration day of the patent document, and the factor is based on a peculiarity in each country, how fast a technique or a technology becomes obsolete in each technical field, and the like. For example, the factor is calculated based on the average of holding periods of patent rights that are applied from then onward before their expiration dates in each technical field in each country. The period of validity is not estimated in the case where the variation among holding periods in the same technical field is large or the case where the number of patents in the same technical field is too small. Therefore, in this case, the factor is not calculated, either. This is because such a period of validity results in an estimated value with low reliability. The period of validity is not estimated in the case where, for example, there is only one patent document in a technical field or the case where the number of patent documents is not more than a prescribed number (e.g., 5, 50, etc.) and the variation among the holding periods is not less than a prescribed number (e.g., 0.5 years, 5 years, etc.).

In addition, a third period, which is a theoretical maximum period of a patent right in a country of application, can be used as a parameter. For example, in Japan, a patent right expires after 20 years from its filing date. Therefore, the third period is set to 20 years. In addition, a fourth period, which is a period from filing date theoretical maximum period of a patent right in a country of application, can be used as a parameter. In addition, the ratio between the third period and the fourth period can be used as a parameter.

The second weight linked to a country where a patent document is applied is calculated by the first evaluation unit 134 and stored in the parameter DB 121 beforehand. Specifically, the second weight is calculated based on the number of applications in the country where a patent document is applied, damages resulting from lawsuits concerning intellectual properties in the country, and the gross domestic product of the country. This is because the use of the number of applications, the damages, and the gross domestic product can serve as an index of how strong the commitment of the country to patent policy. For example, the first evaluation unit 134 calculates the second weight using Expression (4) shown below.

$$t_c = \log(GDP/(\text{Square root of the number of applications} \times \text{Damage})) \quad (4)$$

In Expression (4) above, C is a country of application of the patent document i, tc is a second weight tc of the country C, GDP is the gross domestic product of the country C in the latest year, the number of applications is the number of patent applications in the country C in the latest year, and Damage is damages resulting from lawsuits concerning patent in the country C in the latest years. A large number of applications produces large noise. Therefore, the noise is reduced by using the square root of the number of applications.

As the damages resulting from the lawsuits, damages having ranks that fall within a prescribed range in the country C can be used. If the damages resulting from the lawsuits concerning patent include the top damage of the largest amount of money is used, the damages include a damage that has such a large amount of money accidentally.

Accordingly, for example, considering that many of the top five damages have anomalous values, the average of damages ranging from sixth place to tenth place is used. This increases robustness.

In the case where the patent document i is applied in a regional office (e.g., European Patent Office or African Regional Intellectual Property Organization), the sum, the average, or the like of GDPs of major countries of the region is used. For example, GDP is the sum of GDPs of Germany, France, Switzerland, Italy, and the Netherlands.

In the case where the patent document i is an international application that is internationally published by the International Bureau, GDP is the median or the average of GDPs of countries that belong to the Five IP Offices.

After calculating second weights of countries, the first evaluation unit 134 can normalize the second weights of the countries with the highest second weight taken as 100. At this time, second weights that are not more than a predetermined threshold value can be collectively regarded as having the threshold value. This is to prevent a second weight linked to a country in which the patent document is applied from having a great influence on the first index because of extremely small values. For example, the threshold value is set to within the range of 20 to 40.

The family number is a parameter for such determination that a patent document i having a large family number tends to have a strength of right because the patent document i is to be or may be patented in a plurality of countries. The family number can be subjected to weighting based on to what countries the family members belong. This is because, for example, even in the case where a patent document has a large number of family members, the strength of a patent right according to the patent document significantly differs depending on whether the patent document is applied for patent in a plurality of countries with large economies or in a plurality of countries with not large economies. In this case, the weighting is made in such a manner that the family number is increased when family members tend to be distributed in countries with large economies, countries where patent rights are sufficiently protected, and the like. The weighting is also made in such a manner that the family number is decreased when family members tend to be distributed in countries with not large economies, countries where patent rights are insufficiently protected, and the like.

Moreover, the parameters can include other parameters such as a parameter based on information on the patent document and a parameter based on an economic indicator.

The parameter based on information on the patent document is a parameter that is determined based on information included in the patent document. Specifically, a patent document on which information includes one of prescribed applicants or patentees, one of prescribed inventor names, or one of prescribed keywords, the patent document is determined to tend to have a high strength of right. For example, the prescribed applicants or patentees are set to include large companies, venture companies with a few years in business and high valuation, which are called unicorn companies, other excellent venture companies, and other excellent companies in an industry or a base group. For example, the prescribed inventors are set to include an inventor with a large number of patent rights, an inventor of a patent right for which the payment of a large amount of damages is ordered in a damage suit based on the patent right, and the like. At this time, a parameter based on a patent document is configured to have a high value when information on the patent document includes one of the types of information described above. The parameter based on information on a patent document is stored in the parameter DB 121 beforehand.

The parameter based on an economic indicator is a digitized parameter based on at least one of financial data on an applicant of a patent document, a stock price and other economic indicators of the applicant, and the like. In the case where the information processing system is configured to use the parameter based on an economic indicator, the information processing system is configured to be capable of receiving an input of an economic indicator of an applicant from a user or external equipment. Based on the received economic indicator, the first evaluation unit 134 calculates the parameter based on the economic indicator.

The first evaluation unit 134 evaluates the patent document based on the first index. Specifically, the evaluation is made in such a manner that the patent right according to the patent document is relatively strong in the base group of patent documents when the patent document has a great value of the first index.

For each patent document included in the base group, the second evaluation unit 135 calculates a value based on the first index and the second period of the patent document, uses the value as a second index, and evaluates the total sum of the second index of each patent document of a prescribed applicant out of the patent documents included in the base group as a competitive power of the applicant.

With the lapse of time after the application of a patent document, the citation performance of the patent document increases. As a result, in a base group, the first index of an old patent document can become relatively high. For this reason, the second evaluation unit 135 makes the evaluation by using the first index and additionally by totalizing second periods on an applicant basis, on a technical field basis, on an application year basis, or the like. In the present embodiment, a case where the evaluation is made on an applicant basis will be described.

Specifically, first, for each patent document included in the base group, the second evaluation unit 135 multiplies the first index of the patent document by the second period and uses the resultant value as the second index. Next, the second evaluation unit 135 determines, for each applicant, the total sum of the second indices of patent documents of the applicant included in the base group. At this time, the total sum of the second indices is determined for patent documents of the applicant included in the base group of which the first indices are not less than a prescribed threshold value. This is because the first index of a patent document indicates a relative strength of right of the patent document in a base group, and therefore, a patent document can be determined not to have a competitive power when the patent document is not a patent document with some strength of right. That is, only patent documents having some advantage in competitive power are targeted. The determined total sum of the second indices can be evaluated as an index of an overall competitive power of the applicant as a patent portfolio.

In addition, from the documents included in the base group, the second evaluation unit 135 evaluates the greatest first index of the first indices of the documents of the prescribed applicant, as a third index indicating how formidable the applicant can be for competitors.

Specifically, for each applicant, the second evaluation unit 135 uses, as the third index, the greatest first index of the first indices of the patent documents of the applicant included in the base group. That is, the third index indicates to what degree a value of a patent document that is considered to be strongest of patents possessed by the applicant is. Therefore, the third index can be evaluated as an index indicating whether an applicant has a patent that can be formidable for competitors.

Figure 3:
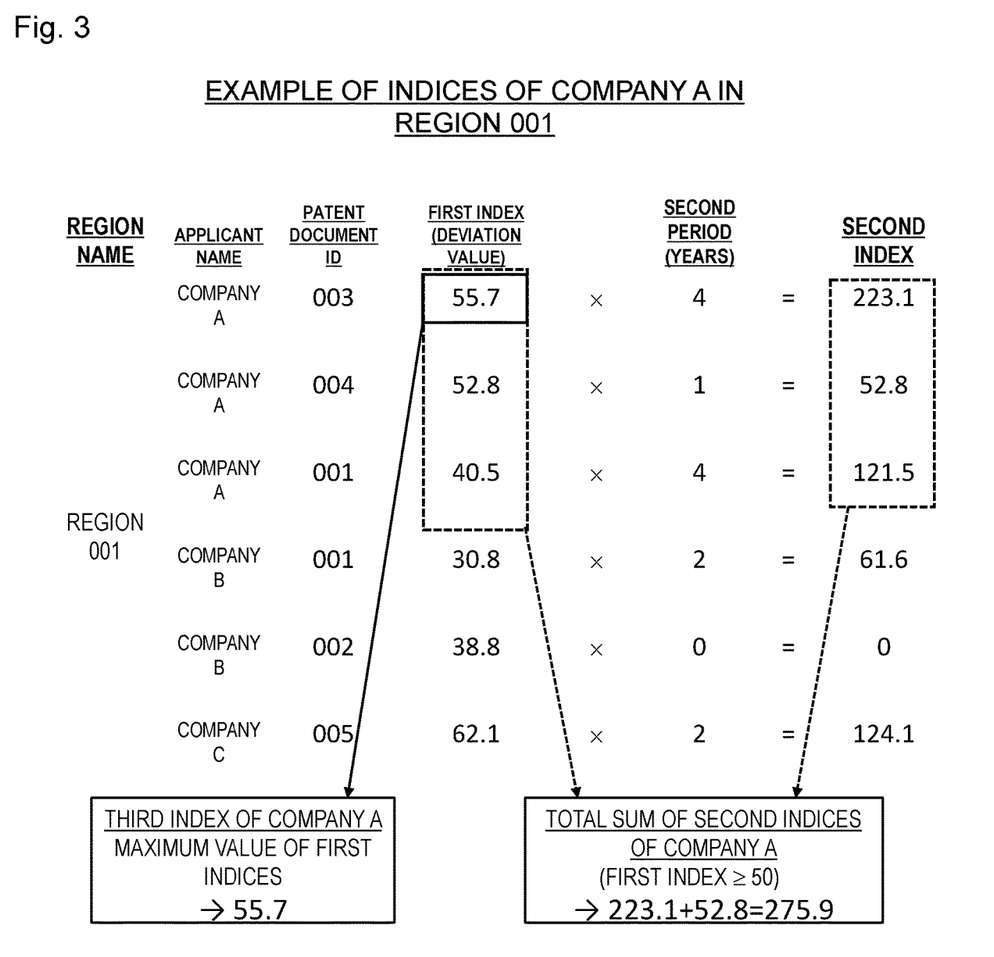
FIG. 3 is a diagram illustrating an example of calculating a second index and a third index.

FIG. 3 illustrates an example of calculating the second index and the third index. As illustrated in FIG. 3, the second evaluation unit 135 calculates the second index by multiplying the first index (e.g., 55.7) and the second period (e.g., 4 years) together (e.g., 223.1). The second evaluation unit 135 determines the total sum of the calculated second indices for each applicant. FIG. 3 illustrates a case where the prescribed threshold value is set to 50, as an example. For example, in the case where the total sum of second indices is determined for a company A, first indices not less than 50 are targeted for the total sum (indicated by broken line frames in FIG. 3). Thus, a patent document 001 having a first index of 40.5 is excluded from the sum of the second indices. Further, the second evaluation unit 135 uses the greatest first index of the applicant as the third index. For example, the maximum value of the first indices of the company A, 55.7, is used as the third index as indicated by solid line frames in FIG. 3. Although the description is given of the case where the prescribed threshold value is set to 50, this is merely an example, and the case is not limitative.

In addition, the second evaluation unit 135 evaluates a value that is calculated based on the third index and the total sum of the second index of each document of the applicant, as a fourth index indicating that the documents of the applicant included in the base group include a prominent technique or technology. Specifically, for each applicant, the second evaluation unit 135 multiplies the total sum of the second indices of the applicant and the third index together and uses the resultant value as the fourth index. The fourth index is the combination of the second index providing the point of view of patent portfolio and the third index providing the point of view of whether any prominent patent exists. Therefore, the fourth index can be evaluated as an index indicating an overall potential of patents possessed by the applicant.

The third evaluation unit 136 evaluates a value that is calculated based on the second indices of the patent documents included in the base group and the number of the patent documents included in the base group, as a fifth index indicating whether the base group has succeeded in efficiently creating a portfolio of valuable patent rights.

Specifically, the third evaluation unit 136 calculates the fifth index by dividing the total sum of the second index of each patent document included in the base group by the number of the patent documents included in the base group. That is, the calculation determines a competitive power per patent document in the base group, thus making the fifth index server as an index for evaluating whether the base group has succeeded in creating a valuable portfolio. In the case where a plurality of base groups are present, the deviation values of fifth indices of the base groups are determined. A base group of which the deviation value is high can be evaluated as having succeeded in creating the portfolio more efficiently than the other base groups.

In addition, the third evaluation unit 136 may calculate a fifth index for a specific applicant. In this case, in the calculation of the fifth index, the total sum of second indices is calculated with patent documents of which the first indices are less than the prescribed threshold value being also included. At this time, the third evaluation unit 136 calculates the fifth index by dividing the total sum of the second indices for the applicant by the number of the patent documents of the applicant included in the base group. The total sum of the second indices is calculated from patent documents of which the first indices are not less than the prescribed threshold value, while the number of patent documents includes patent documents of which the first indices are less than the prescribed threshold value. The fifth index configured in this manner enables the evaluation of a lack of balance in quality in the patent documents of the applicant. When a base group includes more patent documents of which the first indices are less than the prescribed threshold value than patent documents of which the first indices are not less than the prescribed threshold value, the base group can be determined as not having succeeded in creating a portfolio efficiently.

In addition, the third evaluation unit 136 makes an overall evaluation of a base group using a value that is calculated based on the total sum of the second index of each patent document included in the base group, the third index, and the fifth index.

Specifically, the third evaluation unit 136 determines a sixth index that is obtained by multiplying the total sum of the second indices of the base group, the third index, and the fifth index together. The sixth index is the combination of the second index providing the point of view of patent portfolio, the third index providing the point of view of whether any prominent patent exists, and the point of view of the efficiency of a portfolio, thus serving as an index of the overall evaluation of a base group as a portfolio. By comparing the sixth index of a base group with the sixth indices of the other base groups, the overall evaluation of the base group can be made in a relative manner.

The presentation unit 137 controls a process of displaying various screens. Specifically, the presentation unit 137 presents a screen for receiving an input of the name of a legal person or the like and a screen for displaying, to a user, the first index to the sixth index and the total sum of the second indices calculated by the first evaluation unit 134, the second evaluation unit 135, and the third evaluation unit 136.

3. Evaluation Process

Figure 4:
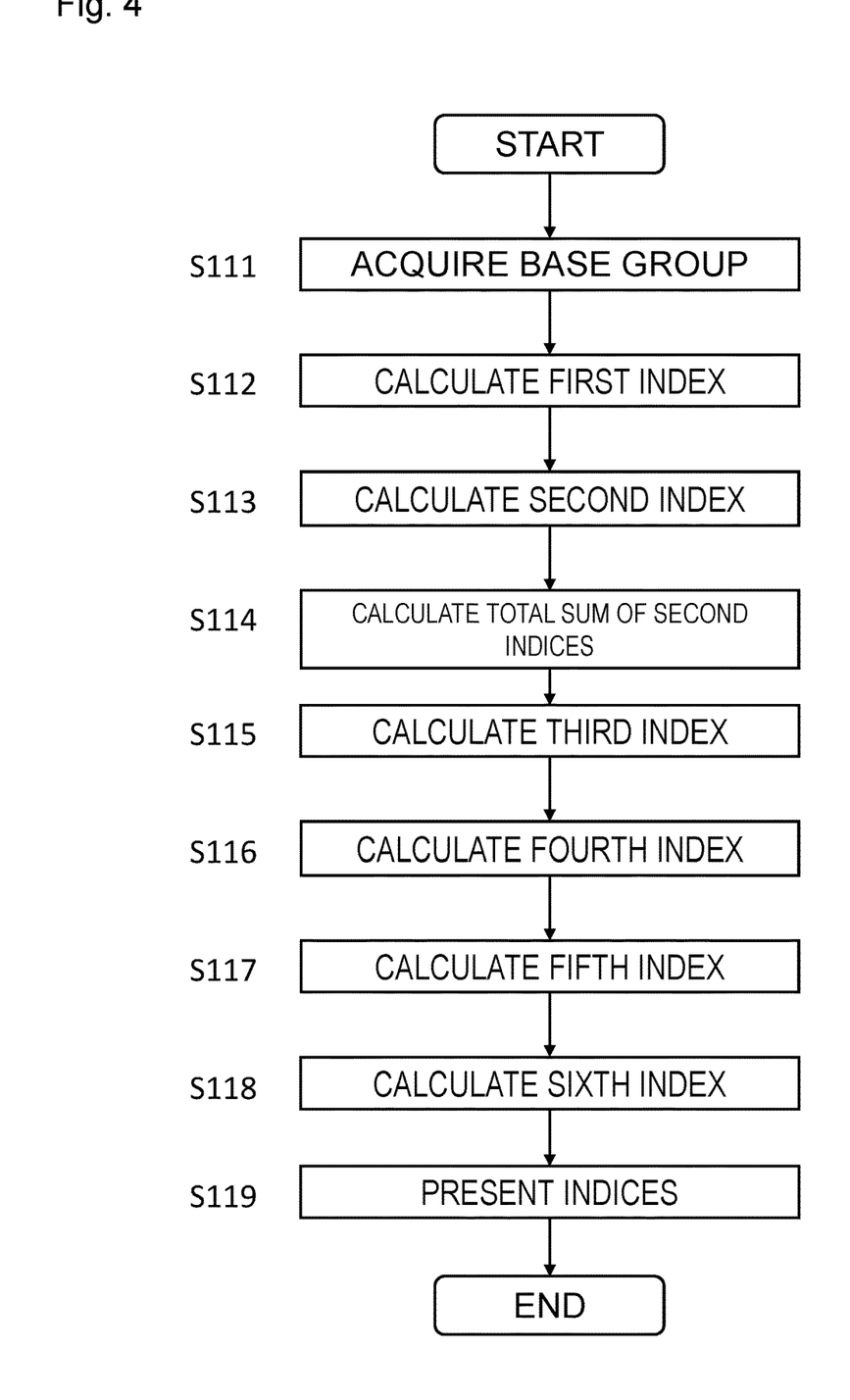
FIG. 4 is a flowchart illustrating a flow example of an evaluation process by the information processing apparatus 10.

Steps of the evaluation process by the information processing apparatus 10 will be described below with reference to the drawing. FIG. 4 is a flowchart illustrating a flow example of the evaluation process by the information processing apparatus 10.

In step S111, the acquisition unit 133 acquires a base group, which is a set of documents concerning a patent right based on a prescribed search query.

In step S112, for each patent document included in the base group, the first evaluation unit 134 calculates a first index of the patent document based on parameter concerning the patent document and a first weight that is linked to patenting of the patent document, as a value that represents a relative relation of the patent document to the patent documents included in the base group in terms of the first index.

In step S113, for each patent document included in the base group, the second evaluation unit 135 multiplies the first index of the patent document by the second period and uses the resultant value as the second index.

In step S114, the second evaluation unit 135 determines, for each applicant, the total sum of the second indices of patent documents of the applicant included in the base group. The determined total sum of the second indices can be evaluated as an index of an overall competitive power of the applicant as a patent portfolio.

In step S115, for each applicant, the second evaluation unit 135 uses, as the third index, the greatest first index of the first indices of the patent documents of the applicant included in the base group. That is, the third index indicates to what degree a value of a patent document that is considered to be strongest of patents possessed by the applicant is. Therefore, the third index can be evaluated as an index indicating whether an applicant has a patent that can be formidable for competitors.

In step S116, the second evaluation unit 135 evaluates a value that is calculated based on the third index and the total sum of the second indices of documents of the applicant, as a fourth index indicating that the documents of the applicant included in the base group include a prominent technique or technology. Specifically, for each applicant, the second evaluation unit 135 multiplies the total sum of the second indices of the applicant and the third index together and uses the resultant value as the fourth index. The fourth index is the combination of the second index providing the point of view of patent portfolio and the third index providing the point of view of whether any prominent patent exists. Therefore, the fourth index can be evaluated as an index indicating an overall potential of patents possessed by the applicant.

In step S117, the third evaluation unit 136 evaluates a value that is calculated based on the second indices of the patent documents included in the base group and the number of the patent documents included in the base group, as a fifth index indicating whether the base group has succeeded in efficiently creating a portfolio of valuable patent rights. Specifically, the third evaluation unit 136 calculates the fifth index by dividing the total sum of the second index of each patent document included in the base group by the number of the patent documents included in the base group.

In step S118, the third evaluation unit 136 determines a sixth index that is obtained by multiplying the total sum of the second indices of the base group, the third index, and the fifth index together. The sixth index is the combination of the second index providing the point of view of patent portfolio, the third index providing the point of view of whether any prominent patent exists, and the point of view of the efficiency of a portfolio, thus serving as an index of the overall evaluation of a base group as a portfolio. By comparing the sixth index of a base group with the sixth indices of the other base groups, the overall evaluation of the base group can be made in a relative manner.

In step S119, the presentation unit 137 presents a screen for displaying, to a user, the first index to the sixth index and the total sum of the second indices calculated by the first evaluation unit 134, the second evaluation unit 135, and the third evaluation unit 136, and ends the process.

As described above, the program according to the present disclosure is capable of appropriately evaluating the value of an intellectual property by causing a computer including a processor to execute a first step of acquiring a base group that is a set of documents concerning a prescribed intellectual property right based on a prescribed search query and a second step of evaluating, for each document included in the base group, a value that is calculated based on a parameter concerning the document and a first weight linked to patenting of the document, as a first index indicating the relative strength of right of the document in the base group.

Although the evaluation of a value of a patent can vary, a conventional scoring system such as one based on a conventional approach only makes an evaluation using the absolute value of a patent. For example, the related art allows an applicant to manipulate a score by intentionally changing a status, which is not reflective of the real condition. Furthermore, even a patent that has a low score from some technical point of view can be a patent that is important from another technical point of view. The score of a patent can be used as the basis of the license fee of a patent right or a claim of damage. The estimate of the license fee or the damage significantly varies based on a market size, and the market size itself differs country by country.

Accordingly, the value of a patent derived from a single embodiment varies relatively depending on countries where the patent is granted.

In contrast, according to the present disclosure, the value of an intellectual property is evaluated in terms of the first index indicating a relative strength of right in a base group that is a set of documents concerning a prescribed intellectual property right based on a prescribed search query. Therefore, the value of the intellectual property right can be evaluated appropriately.

Embodiments according to the disclosure are described above. These embodiments can be embodied in other various forms and can be embodied with various omissions, substitutions, and changes. These embodiments and modifications as well as those subjected to the omissions, substitutions, and changes are included in the technical scope of claims and the scope of equivalents thereof.

For example, the description of the above embodiments is given of the case where the information processing apparatus 10 presents the indices as an example, but this is not limitative. The information processing apparatus 10 may function as a server, calculating the indices in response to a request from external equipment. The functions of the information processing apparatus 10 may be implemented in a plurality of pieces of equipment to form a system to make the evaluation of a patent.

The information processing apparatus 10 may receive an input of the name of a legal person or the like for which the evaluation of a patent is made. The information processing apparatus 10 may receive the name of the legal person or the like from external equipment. In these cases, the second evaluation unit 135 calculates the second index to the fourth index for an applicant having the received name of the legal person or the like.

The intellectual property includes an intellectual property of which the registration of right is published, such as a patent, a utility model, an industrial design, a trademark, other types of intellectual properties, or foreign intellectual properties, irrespective of whether the intellectual property is domestic or foreign in Japan. It should be noted that Japan does not have an early publication system for an industrial design at the time of the filing of its application. However, an industrial design can be published by International Bureau or foreign countries. The present disclosure can be applied to the case of a utility model, by regarding the registration of the utility model as the registration of a patent when the technical evaluation of the utility model is made, and the technical evaluation results in a positive opinion.

Examples of Application to Fields Other Than Intellectual Property

Although the description of the above embodiments is given of the case where the present disclosure is used for evaluating the value of an intellectual property as an example, this is not limitative. For example, the present disclosure can be used for evaluating the value of a research subject or a research institution. In this case, as the document, information on research funds that is publicly or privately funded or subsidized can be used. The information on research funds includes a research project title, a research category, an allocation type, a review section, a research institution, a representative of the research, a project period, the status of the research, a total cost, a report, a research product, and the like.

In this case, a base group that is a set of pieces of information on research funds is collected with a prescribed search query. The base group is a set of pieces of information on research funds that are searched for with a specific technique region, researcher, keyword, or the like.

For an intellectual property, an intellectual property right is registered, which corresponds to a written application of a research subject created by a research institution or the like is adopted after a peer review by at least one governmental person in charge or expert.

A parameter or a weight used for evaluating the value of a research subject or a research institution can be set as appropriate. For example, the number of citations of a paper being a research product or the number of joint researches can be used. The parameter is set as appropriate.

Supplement

The matters described in the embodiments described will be supplemented below.

(Supplement 1) A program causing a computer including a processor to execute a first step of acquiring a base group that is a set of documents concerning a prescribed intellectual property right based on a prescribed search query and a second step of evaluating, for each document included in the base group, a value that is calculated based on a parameter concerning the document and a first weight linked to patenting of the document, as a first index indicating the relative strength of right of the document in the base group. By executing the program, the value of an intellectual property can be evaluated appropriately.

(Supplement 2) The program according to (Supplement 1), wherein in the second step, for each document included in the base group, the first index of the document is calculated as a value that represents a relative relation of the document to documents included in the base group in terms of the first index. By executing the program, the first index is calculated as a value that represents a relative relation to the documents in terms of the first index, allowing a relative evaluation that is adapted to an acquisition method of the base group, so that the value of an intellectual property can be evaluated appropriately.

(Supplement 3) The program according to (Supplement 1) or (Supplement 2), wherein in the second step, at least one of the ratio between a first period from an application until patenting and a second period from a prescribed reference date until a scheduled date of lapse of right, a second weight that is linked to a country in which the document is applied, a family number of the document, and a citation performance that indicates the number of citations of the document in other documents is used as the parameter. By executing the program, the use of the parameter enables the value of an intellectual property to be evaluated appropriately according to when the evaluation is made. By setting the scheduled date of lapse of right as appropriate, an evaluation that is adapted to the obsolescence or the trend of a technique or a technology can be made.

(Supplement 4) The program according to (Supplement 3), wherein the second weight is calculated based on the number of applications in a country where the document is applied, damages resulting from a lawsuit concerning the intellectual property in the country, and a gross domestic product of the country. By calculating the second weight in this manner, the value of an intellectual property can be evaluated appropriately according to an international economic trend and an international policy.

(Supplement 5) The program according to (Supplement 4), wherein, as the damages resulting from the lawsuit, damages having ranks that fall within a prescribed range in the country are used. By using the damages having ranks that fall within the prescribed range in this manner, the robustness of the evaluation can be enhanced.

(Supplement 6) The program according to any one of (Supplement 3) to (Supplement 5), wherein the program causes the computer to execute a third step of evaluating, for each document included in the base group, a value that is calculated based on the first index and the second period of the document, as a second index indicating a competitive power of the intellectual property right in the base group. By evaluating the second index indicating the competitive power of the intellectual property right in this manner, each document in the base group can be evaluated quantitatively.

(Supplement 7) The program according to (Supplement 6), wherein the program causes the computer to execute a fourth step of evaluating a total sum of the second index of each document of a prescribed applicant out of documents included in the base group, as a competitive power of the applicant. By calculating the total sum of the second index of each document of the prescribed applicant in this manner, an overall competitive power of the applicant as a patent portfolio can be evaluated.

(Supplement 8) The program according to (Supplement 6), wherein the program causes the computer to execute a fifth step of evaluating a greatest one of the first index of each document of a prescribed applicant out of documents included in the base group, as a third index indicating how formidable the applicant can be for a competitor. By evaluating the third index indicating how formidable the applicant can be for a competitor in this manner, whether the applicant has a patent that is formidable for the competitor can be evaluated.

(Supplement 9) The program according to (Supplement 8), wherein the program causes the computer to execute a sixth step of evaluating a value that is calculated based on the third index and the total sum of the second index of each document of the applicant, as a fourth index indicating that documents of the applicant included in the base group include a prominent technique or technology. By evaluating the value as the fourth index in this manner, an overall potential of patents possessed by the applicant can be evaluated because the fourth index is the combination of the second index providing the point of view of patent portfolio and the third index providing the point of view of whether any prominent patent exists.

(Supplement 10) The program according to (Supplement 8) or (Supplement 9), wherein the program causes the computer to execute a seventh step of evaluating a value that is calculated based on the second index of each document included in the base group and the number of documents included in the base group, as a fifth index indicating whether the base group has succeeded in efficiently creating a portfolio of the intellectual property right that is valuable. By executing the program, the fifth index is evaluated, and thus whether the base group has succeeded in creating a valuable portfolio can be evaluated.

(Supplement 11) The program according to (Supplement 10), wherein the program causes the computer to execute an eighth step of making an overall evaluation of the base group using a value that is calculated based on the total sum of the second index of each document included in the base group, the third index, and the fifth index. By performing the eighth step in this manner, the overall evaluation of the base group can be made.

(Supplement 12) The program according to any one of (Supplement 1) to (Supplement 11), wherein the intellectual property right is a patent right, a utility model right, or an industrial design right. By using a document concerning a patent right, a utility model right, or an industrial design right in this manner, an evaluation can be made on a right of which the value is conventionally difficult to evaluate.

(Supplement 13) An information processing apparatus including: an acquisition unit that acquires a base group being obtained with a prescribed search query and being a set of documents concerning a prescribed intellectual property right; and a first evaluation unit that evaluates, for each document included in the base group, a value that is calculated based on a parameter concerning the document and a first weight linked to patenting of the document, as a first index indicating a relative strength of right of the document in the base group. By the information processing apparatus, the value of an intellectual property can be evaluated appropriately.

(Supplement 14) A server including: an acquisition unit that acquires a base group being obtained with a prescribed search query and being a set of documents concerning a prescribed intellectual property right; and a first evaluation unit that evaluates, for each document included in the base group, a value that is calculated based on a parameter concerning the document and a first weight linked to patenting of the document, as a first index indicating a relative strength of right of the document in the base group. By the server, the value of an intellectual property can be evaluated appropriately.

(Supplement 15) An information processing method including: acquiring a base group being obtained with a prescribed search query and being a set of documents concerning a prescribed intellectual property right; and evaluating, for each document included in the base group, a value that is calculated based on a parameter concerning the document and a first weight linked to patenting of the document, as a first index indicating a relative strength of right of the document in the base group. By the information processing method, the value of an intellectual property can be evaluated appropriately.

The invention claimed is:

1. An information processing apparatus comprising:
   processing circuitry configured to:
   receive a prescribed search query from a computing device;
   in response to the receiving the prescribed search query;
   acquire a base group obtained with the prescribed search query, wherein the base group is a set of documents concerning a prescribed intellectual property right;
   retrieve, from a plurality of external locations accessible via a computer network, the set of documents, wherein the set of documents includes documents; and
   calculate, for each document included in the set of documents, each value as each first index based on a parameter concerning the document, a first weight linked to patenting of the document, and a second weight as a second index indicating a competitive power of an intellectual property right in the set of documents,
   wherein said each first index indicates a relative strength of right of the document in the set of documents, and represents a relative relation of the document to other documents of the set of documents in terms of said first index;
   compare said each first index of said each document in the set of the documents to a prescribed threshold value, and eliminate a portion of the base group based on the comparison of said each first index to the prescribed threshold value;
   retrieve, via a network connection, a present value of at least one indicator related to an applicant of the document;
   determine a final value based on the present value of the at least one indicator;
   display on a screen of the computing device, to a user, the final value and a remaining portion of the base group after the eliminating the portion of the base group,
   wherein the parameter is at least one of a ratio between a first period and a second period, wherein the first period extends from a filing date of a patent application until a patenting date of a patent resulting from the patent application, wherein the second period extends from a prescribed reference date until a scheduled date, the scheduled date is associated with a lapse of patent right of the patent, and wherein the second weight is linked to a country in which the document is applied, and
   wherein a citation performance that indicates a number of citations of the document in the other documents of the set of documents is reused as the parameter concerning the document, and wherein the citation performance is related to the first index and the second period;
   evaluate a greatest first index of the first indexes for a prescribed applicant out of documents in the set of documents to determine the greatest first index of the first indexes to be as a third index; and
   present on the computing device the third index as a competitor formidability index.

2. The information processing apparatus according to claim 1, wherein the second weight is calculated based on the number of applications in a country where the document is applied, damages resulting from a lawsuit concerning the intellectual property right in the country, and a gross domestic product of the country.

3. The information processing apparatus according to claim 2, wherein as the damages resulting from the lawsuit, damages having ranks that fall within a prescribed range in the country are used.

4. The information processing apparatus according to claim 1, wherein the processing circuitry evaluates a total sum of the second index of each document of a prescribed applicant out of documents included in the base group, as a competitive power of the applicant.

5. The information processing apparatus according to claim 1, wherein the processing circuitry calculates a value that is calculated based on the third index and a total sum of the second index of each document of the applicant, as a fourth index indicating that documents of the applicant included in the base group include a prominent technique or technology.

6. The information processing apparatus according to claim 1, wherein the processing circuitry divides a total sum of the second index of each document included in the base group by the number of documents included in the base group to calculate a fifth index indicating whether the base group has succeeded in efficiently creating a portfolio of the intellectual property right that is valuable.

7. The information processing apparatus according to claim 6, wherein the processing circuitry makes an overall evaluation of the base group using a value that is calculated based on the total sum of the second index of each document included in the base group, the third index, and the fifth index.

8. The information processing apparatus according to claim 1, wherein the intellectual property right is a patent right, a utility model right, or an industrial design right.

9. A server comprising:
processing circuitry configured to:
receive a prescribed search query from a computing device;
in response to the receiving the prescribed search query:
acquire a base group obtained with the prescribed search query, wherein the base group is a set of documents concerning a prescribed intellectual property right;
retrieve, from a plurality of external locations accessible via a computer network, the set of documents, wherein the set of documents includes documents; and
calculate, for each document included in the set of documents, each value as each first index based on a parameter concerning the document, a first weight linked to patenting of the document, and a second weight as a second index indicating a competitive power of an intellectual property right in the set of documents, as wherein said each first index indicates a relative strength of right of the document in the set of documents, and represents a relative relation of the document to other documents of the set of documents in terms of said first index;
compare said each first index of said each document in the set of the documents to a prescribed threshold value, and eliminate a portion of the base group based on the comparison of said each first index to the prescribed threshold value;
retrieve, via a network connection, a present value of at least one indicator related to an applicant of the document;
determine a final value based on the present value of the at least one indicator;
display on a screen of the computing device, to a user, the final value and a remaining portion of the base group after the eliminating the portion of the base group,
wherein the parameter is at least one of a ratio between a first period and a second period, wherein the first period extends from a filing date of a patent application until a patenting date of a patent resulting from the patent application, wherein the second period extends from a prescribed reference date until a scheduled date, the scheduled date is associated with a lapse of patent right of the patent, and wherein the second weight is linked to a country in which the document is applied,
wherein a citation performance that indicates a number of citations of the document in the other documents of the set of documents is reused as the parameter concerning the document, and wherein the citation performance is related to the first index and the second period;
evaluate a greatest first index of the first indexes for a prescribed applicant out of documents in the set of documents to determine the greatest first index of the first indexes to be as a third index; and
present on the computing device the third index as a competitor formidability index.

10. A method, the method comprising:
receiving, by a computer, a prescribed search query from a computing device;
in response to the receiving the prescribed search query;
acquiring, by the computer, a base group obtained with the prescribed search query, wherein the base group is a set of documents concerning a prescribed intellectual property right,
retrieving, from a plurality of external locations accessible via a computer network, the set of documents, wherein the set of documents includes documents; and
calculating, by the computer, for each document included in the set of documents, each value as each first index based on a parameter concerning the document, a first weight linked to patenting of the document, and a second weight as a second index indicating a competitive power of an intellectual property right in the set of documents, wherein said each first index indicates a relative strength of right of the document in the set of documents, and represents a relative relation of the document to other documents of the set of documents in terms of said first index;
comparing, by the computer, said each first index of said each document in the set of the documents to a prescribed threshold value, and eliminate a portion of the base group based on the comparison of said each first index to the prescribed threshold value;
retrieving, via a network connection, a present value of at least one indicator related to an applicant of the document;
determining, by the computer, a final value based on the present value of the at least one indicator;
displaying on a screen of the computing device, to a user, the final value a remaining portion of the base group after the eliminating the portion of the base group,
wherein the parameter is at least one of a ratio between a first period and a second period, wherein the first period extends from a filing date of a patent application until a patenting date of a patent resulting from the patent application, wherein the second period extends from a prescribed reference date until a scheduled date, the scheduled date is associated with a lapse of patent right of the patent, and wherein the second weight is linked to a country in which the document is applied, and
wherein a citation performance that indicates a number of citations of the document in the other documents of the set of documents is reused as the parameter concerning the document, and wherein the citation performance is related to the first index and the second period;
evaluating, by the computer, a greatest first index of the first indexes for a prescribed applicant out of documents in the set of documents to determine the greatest first index of the first indexes to be as a third index; and
presenting on the computing device the third index as a competitor formidability index.

* * * * *